(12) United States Patent
Heldebrant et al.

(10) Patent No.: US 8,980,210 B2
(45) Date of Patent: Mar. 17, 2015

(54) CAPTURE AND RELEASE OF ACID-GASSES WITH ACID-GAS BINDING ORGANIC COMPOUNDS

(75) Inventors: David J. Heldebrant, Richland, WA (US); Clement R. Yonker, Kennewick, WA (US); Phillip K. Koech, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 947 days.

(21) Appl. No.: 12/427,851

(22) Filed: Apr. 22, 2009

(65) Prior Publication Data

US 2009/0220397 A1 Sep. 3, 2009

Related U.S. Application Data

(63) Continuation-in-part of application No. 12/360,717, filed on Jan. 27, 2009, now Pat. No. 7,799,299.

(60) Provisional application No. 61/023,994, filed on Jan. 28, 2008, provisional application No. 61/099,387, filed on Sep. 23, 2008.

(51) Int. Cl.
*C01B 17/16* (2006.01)
*B01D 47/00* (2006.01)
(Continued)

(52) U.S. Cl.
CPC ........ *B01D 53/1493* (2013.01); *B01D 53/1425* (2013.01); *B01D 53/1456* (2013.01);
(Continued)

(58) Field of Classification Search
USPC ........ 423/220, 210, 235, 242.1, 242.2, 242.3, 423/242.7
See application file for complete search history.

(56) References Cited

U.S. PATENT DOCUMENTS 3,280,214 A * 10/1966 Mitchell .................. 528/33
4,113,849 A 9/1978 Atwood
(Continued)

FOREIGN PATENT DOCUMENTS

CA 2527144 A1 11/2005
CA 2539418 A1 3/2006
(Continued)

OTHER PUBLICATIONS

Jessop, Philip G., et al., Nature, vol. 436, Aug. 25, 2005
(Continued)

*Primary Examiner* — Bijay Saha
(74) *Attorney, Agent, or Firm* — Derek H. Maughan

(57) ABSTRACT

A system and method for acid-gas capture wherein organic acid-gas capture materials form hetero-atom analogs of alkyl-carbonate when contacted with an acid gas. These organic-acid gas capture materials include combinations of a weak acid and a base, or zwitterionic liquids. This invention allows for reversible acid-gas binding to these organic binding materials thus allowing for the capture and release of one or more acid gases. These acid-gas binding organic compounds can be regenerated to release the captured acid gasses and enable these organic acid-gas binding materials to be reused. This enables transport of the liquid capture compounds and the release of the acid gases from the organic liquid with significant energy savings compared to current aqueous systems.

1 Claim, 3 Drawing Sheets

(51) Int. Cl.
*B01D 53/14* (2006.01)
*B01D 53/40* (2006.01)

(52) U.S. Cl.
CPC .......... *B01D53/40* (2013.01); *B01D 2257/302* (2013.01); *B01D 2257/304* (2013.01); *B01D 2257/308* (2013.01); *B01D 2257/404* (2013.01); *B01D 2257/504* (2013.01)
USPC ........ 423/220; 423/210; 423/235; 423/242.1; 423/242.2; 423/242.3; 423/242.7

(56) References Cited

U.S. PATENT DOCUMENTS

| | | | |
|---|---|---|---|
| 5,017,347 A * | 5/1991 | Epperly et al. | 423/235 |
| 5,170,727 A | 12/1992 | Nielsen | |
| 5,817,716 A * | 10/1998 | Le Perchec et al. | 525/54.11 |
| 6,036,931 A | 3/2000 | Yoshida et al. | |
| 6,071,484 A | 6/2000 | Dingman, Jr. et al. | |
| 7,459,134 B2 * | 12/2008 | Cadours et al. | 423/210 |
| 7,485,729 B2 * | 2/2009 | Hsieh et al. | 548/103 |
| 2003/0047309 A1 | 3/2003 | Thomas et al. | |
| 2004/0118749 A1 | 6/2004 | Lesemann et al. | |
| 2005/0113450 A1 | 5/2005 | Thorarensen et al. | |
| 2005/0227959 A1 | 10/2005 | Yoshida et al. | |
| 2005/0234044 A1 | 10/2005 | Groneberg et al. | |
| 2006/0004025 A1 | 1/2006 | Brookings et al. | |
| 2006/0216267 A1 * | 9/2006 | Kovacs et al. | 424/78.27 |
| 2007/0021382 A1 | 1/2007 | Assaf et al. | |
| 2007/0111926 A1 * | 5/2007 | Zundel et al. | 514/3 |
| 2007/0213545 A1 * | 9/2007 | Bolk et al. | 549/536 |
| 2007/0255064 A1 | 11/2007 | Szarvas et al. | |
| 2008/0058549 A1 * | 3/2008 | Jessop et al. | 564/238 |
| 2008/0112866 A1 * | 5/2008 | Davis | 423/220 |
| 2008/0197084 A1 | 8/2008 | Jessop | |
| 2010/0150804 A1 * | 6/2010 | Davis, Jr. | 423/226 |

FOREIGN PATENT DOCUMENTS

| | | |
|---|---|---|
| CA | 2527144 A1 | 5/2007 |
| EP | WO2008068411 A2 | 6/2008 |
| FR | 2909010 A1 | 11/2006 |
| JP | 2003261315 A | 9/2003 |
| WO | 2008/068411 A2 | 6/2008 |
| WO | 2008068411 A2 | 6/2008 |
| WO | 2008122030 A2 | 9/2008 |

OTHER PUBLICATIONS

Anderson, Jessica L., et al., The Journal of Physical Chemistry B., vol. 110, No. 31 (2006).
Liu, Yingxin, et al., Science, vol. 313, Aug. 18, 2006.
Huang, Jun, et al., Journal of Molecular Catalysis A: Chemical 279 (2008) pp. 170-176.
Siqueira, Leonardo J. A., et al., The Journal of Physical Chemistry B., vol. 112 (2008).
English translation of International Publication No. WO 2008/0668411 A2.
Partial International Search Report.
Wu, Weize, et al., Desulfurization of Flue Gas: $SO_2$ Absorption by an Ionic Liquid**, Angewandte Chem. Int. Ed., 2004, 43, 2415-2417.
Yuan, Xiao Liang, et al., Hydroxyl Ammonium Ionic Liquids: Synthesis, Properties, and Solubility of $SO_2$, J. Chem. Eng. Data, 2007, 52, 596-599.
Partial International Search Report/Written Opinion, 2009.
English Translation of JP 2003/261315.
Heldebrant, David J. et al., $CO_2$-binding organic liquids ($CO_2$BOLs) for post-combustion $CO_2$ capture, Energy Procedia 1 (2009) 1187-1195.
Heldebrant, David J., et al., Reversible Uptake of COS, $CS_2$, and $SO_2$: Ionic Liquids with O-Alkylxanthate, O-Alkythiocarbonyl, and O-Alkysulfite Anions, 7619-7627, 15, 2009.
PCT Written Opinion/International Search Report, 2010.

* cited by examiner

Amine    Weak Acid           Ionic Liquid (R=alkyl)

I

II

III

IV $$\begin{pmatrix} R_1, R_2 = \text{Alkyl, aryl, silyl ether, ester.} \\ X1 = S, O. \\ X2 = S, C. \\ n = 1, 2, 3 \text{ to } 20 \text{ or organic linker.} \end{pmatrix}$$

CAPTURE AND RELEASE OF ACID-GASSES WITH ACID-GAS BINDING ORGANIC COMPOUNDS

PRIORITY

This application claims priority from and is a continuation in part of application Ser. No. 12/360,717 which claims priority from provisional patent application No. 61/023,994 and provisional patent application No. 61/099,387. The contents of all of these prior related applications are incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

BACKGROUND OF THE INVENTION

The release of greenhouse and acid gases into the air produces local and global effects on the environment. The combustion of fossil fuels generates acid gases such as carbon dioxide ($CO_2$), sulfur oxides ($SO_2$ and COS), sulfides ($H_2S$) and nitrogen oxides ($NO_x$). Fixed combustion sources, such as coal burning power plants, generate significant acid gas emissions released in their flue gas. The capture and removal of the acid gases, carbon dioxide ($CO_2$), sulfur oxides ($SO_2$, $SO_3$, COS and $H_2S$) and nitrogen oxides ($NO_x$) from flue gas will become an even greater issue as coal becomes more prominent in America's future energy consumption. The capture of significant amounts of greenhouse and acid gases from emission sources is desired to reduce the environmental effects of these sources.

Current aqueous flue gas scrubbing technologies are typically too energy intensive to be used industrially or often require the use of toxic materials which further complicates implementation. Various current aqueous scrubbing technologies remove sulfur oxides and nitrogen oxides from flue gas trapping these acid gases as the basic salts of their acid gases (thiocarbonates, dithiocarbonates, sulfites and nitrate) using a highly basic solution of caustic soda or lime. In these examples the binding is stoichiometric and irreversible and results in a base that cannot be reused. What is needed therefore is a way of providing an effective method of removing acid gasses that over comes these deficiencies that exist in the prior art embodiments. The present invention provides such a method and system.

SUMMARY OF THE INVENTION

This application describes reversible acid-gas binding organic liquid materials, systems and methods that permit capture of one or more of the several acid gases. These acid-gas binding organic compounds can be regenerated to release the captured acid gasses and enable these organic acid-gas binding materials to be reused. This enables transport of the liquid capture compounds and the release of the acid gases from the organic liquid with significant energy savings compared to current aqueous systems. The acid gas capture compound is preferably a liquid material that can be easily transported to allow movement of the captured material from the scrubbing location to a second stage where the acid gas can be removed for storage or processing. Once the acid gas is removed from the organic liquid, the organic liquid can be returned to the system and the process repeated.

Various embodiments of the present invention are described here in. However it is to be understood that the invention is not limited solely to these described embodiments. The presently described embodiments include acid-gas capturing organic materials (herein referred to as $SO_2$ binding organic liquids ($SO_2BOLs$), COS binding organic liquids (COSBOLs), $CS_2$ binding organic liquids ($CS_2BOLs$), hydrogen sulfide binding organic liquids ($H_2SBOLs$) and nitrogen dioxide binding organic liquids ($NO_2BOLs$)) each material being comprised of a strong organic base (preferably, but not limited to, amidines or guanidines) and a weak acid (preferably, but not limited to alcohols). The alcohol, base and acid gas chemically react together to form hetero-atom analogues. Each of these systems when combined with a target acid gas form hetero-atom analogues of alkyl carbonates that reversibly release the respective acid gas with mild heating and regenerate the underlying binding organic bases. In some embodiments these are single molecules of zwitteronic liquids. While these preferred embodiments have been described it is to be distinctly understood that the invention is not limited thereto but may be variously alternatively embodied and configured according to the particular needs and necessities of the user. In particular the description of the binding organic materials as liquids should not be interpreted as limiting these materials to only a particular form in as much as various materials change phase or form at various temperatures and various alternatives of the present invention may require various alternative uses depending upon the particular needs and necessities of the user.

The capture of acid gases in organic media as alkyl-salts (alkyl-carbonates, -sulfites, -nitrates, xanthates, and thiocarbonates) results in compounds that are capable of releasing the acid gases with less energy input as compared to other methods. The reduced hydrogen bonding in organic systems compared to aqueous systems reduces the thermodynamic stability of the chemically bound acid gas and requires less energy to release the acid gas. In addition, the lower specific heat of organic liquid systems (specific heat ~2 J/g/° K) requires only half the energy to heat the liquid compared to that required to heat the water in aqueous systems (specific heat ~4 J/g/° K).

These features provide for a variety of advantages over the prior art including but not limited to embodiments and applications wherein for example acid gases such as SOx and NOx can be scrubbed from exhaust gasses and captured as acid-gas salts that exhibit low energy binding acid gas capture phenomena. Such a scrubber could be acid gas specific e.g. NO2BOLs and SO2BOLs. The lack of hydrogen bonding and highly delocalized charges would reduce the energy requirement for acid gas removal from these systems. Selective acid gas removal can be temperature dependent, resulting in delivery of each acid gas independently and cleanly. In another embodiment the present invention can be utilized to form thermally stable materials that can also be transported and captured so as to allow for selective capture and sequestration of materials. In addition to being regenerable the present invention also provides for increased capture capacity compared to current alternative embodiments, for example the SO2BOLs have the ability to absorb 3 equivalents molecular equivalents of material due to the combination of physical and chemical absorption that this compound provides.

In yet another application of the present invention these materials can be utilized to serve as a sensor. In one embodiment, CO2 or NOx and SOx sensors with Reichardt's dye were created utilizing the materials described herein. Due to the polarity change of the formation of the ionic form of the CO2BOL, placing a solvatochromatic dye inside the solution will indicate CO2 presence by a simple color change going from non-polar to polar when CO2 is bound chemically. This sensor is reusable by gently removing CO2 with energy. In addition to these embodiments the compositions of the present inventions may be utilized in a variety of alternative embodiments including but not limited to: applications where these hetero-atom analogs are created and utilized as reactive reagents; applications for reversible metal complexation, metal capture or chelation; as portions of a control phase in catalysis or scrubbing systems; as temperature controlled acid reagents, and in other applications.

While the aforementioned advantages and descriptions have been provided, various additional advantages and novel features of the present invention are described herein and will become further readily apparent to those skilled in this art from the following detailed description. In the preceding and following descriptions I have shown and described only the preferred embodiment of the invention, by way of illustration of the best mode contemplated for carrying out the invention. As will be realized, the invention is capable of modification in various respects without departing from the invention. Accordingly, the drawings and description of the preferred embodiment set forth hereafter are to be regarded as illustrative in nature, and not as restrictive.

BRIEF DESCRIPTION OF THE DRAWINGS

FIGS. 4(I) 4(II) 4(III) and 4(IV) show various alternative base embodiments of the present invention.

DESCRIPTION

Figure 1:
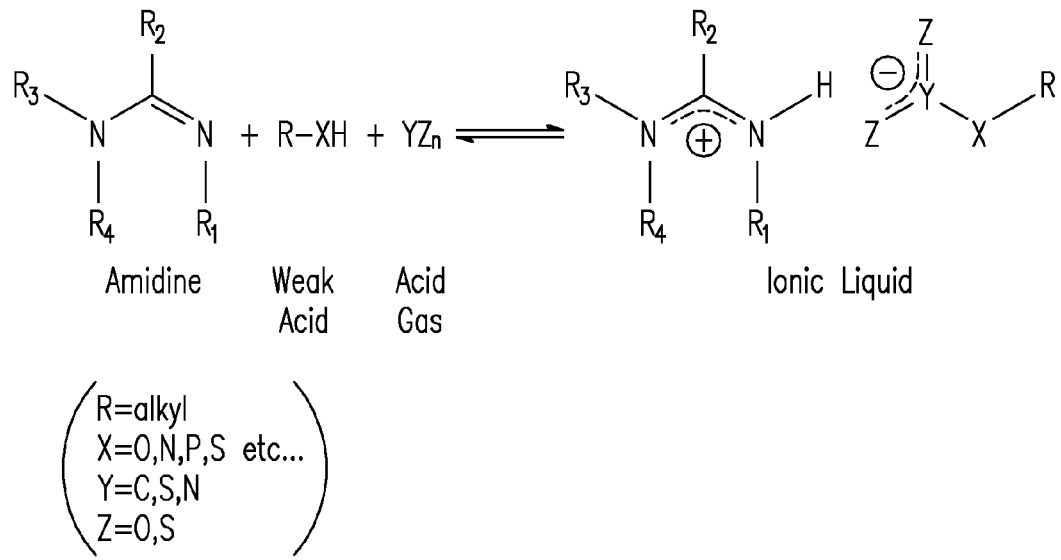
FIG. 1 shows a first embodiment of the present invention

The following descriptions include various modes of various embodiments of the present invention. It will be clear from this description of the invention that the invention is not limited to these illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

Various examples of the present invention are found in FIGS. 1-5. While these illustrated examples are provided it is to be distinctly understood that the invention is not limited thereto. Add gases form when a particular gas is contacted with water for example: $H_2CO_3$ is formed when $CO_2$ is contacted with water $H_2SO_3$ is created when $SO_2$ is contacted with water, $H_2OCOS$ from COS, $H_2OCS_2$ from $CS_2$, and $H_2NO_3$ from $NO_2$. Capture of these acid gasses has been demonstrated using organic base and weak acid, in some cases alcohol blends. These organic capture materials are non-corrosive, organic liquid acid gas trapping agents that permit pumping of the liquid chemically bound acid gasses and can be regenerated by treatment with heat, pressure, chemicals, light, electricity or even ultra sound. For example, diazabicyclo[5.4.0]undec-7-ene (DBU) and 1-hexanol when exposed to $CO_2$ forms a thermally reversible liquid salt that can be regenerated with gentle heating (50° C.) under $N_2$, releasing the bound $CO_2$. Other materials perform similarly and provide similar advantages and advantages. (See Equations 1-5).

$$CO_2+Base+ROH \rightarrow [Base\ H^+][ROCO_2^-] \quad (1)$$

$$SO_2+Base+ROH \rightarrow [Base\ H^+][ROSO_2^-] \quad (2)$$

$$COS+Base+ROH \rightarrow [Base\ H^+][ROCOS^-] \quad (3)$$

$$CS_2+Base+ROH \rightarrow [Base\ H^+][ROCS_2^-] \quad (4)$$

$$NO_2+Base+ROH \rightarrow [Base\ H^+]RONO_2^-] \quad (5)$$

These salts are typically reversible under mild heating conditions, thus allowing the constituents of the acid gas to be removed and the underlying base to be reused. In addition to these applications these reactions are tunable based upon a variety of factors including but not limited to temperature, pressure, viscosity, boiling points, solvent dielectric, thermal conductivity, surface tension, heat capacity, solvent polarity, miscibility, chemical binding with alcohol and base blends, and combinations thereof.

In most prior art methods, removing acid gases from a base involves highly basic and corrosive solutions of lime and caustic soda. In addition, the post-combustion chemical trapping agents, stoichiometrically react with acid gases until consumed to form thermally stable thiocarbonate, dithiocarbonate, nitrate, and sulfite salts. Each thermally stable salt that is produced from this capture requires significant amounts of energy to decompose the salt to release the acid gas. The enormous energy required renders these prior art methods economically unpractical. The present embodiments provide methods and systems for capture and release of acid gasses in a way that is more efficient and effective than prior art methods.

Figure 2:
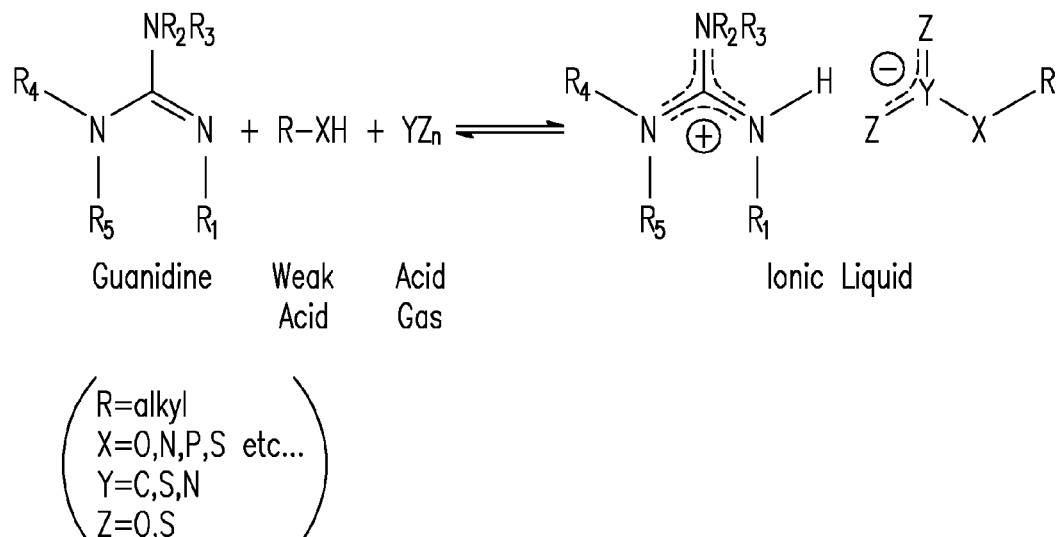
FIG. 2 shows a second embodiment of the present invention
Figure 3:
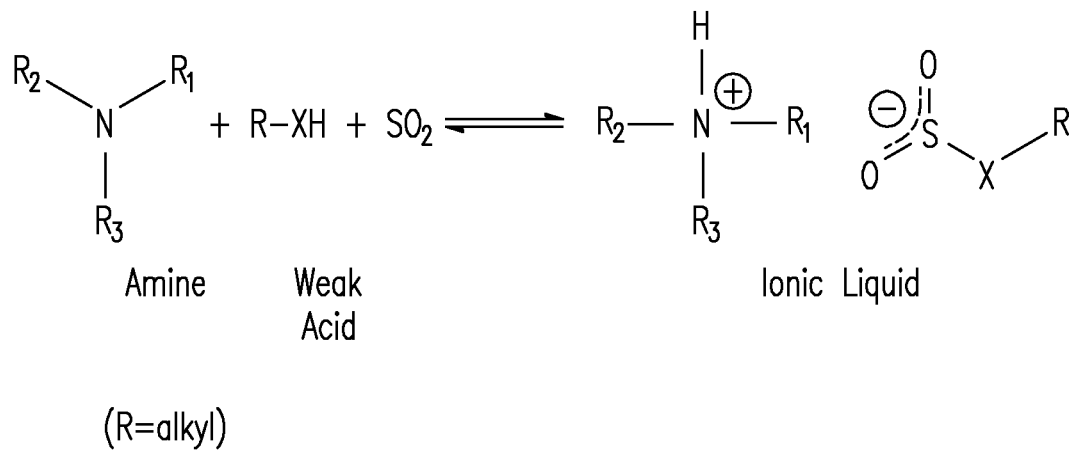
FIG. 3 shows a third embodiment of the present invention
Figure 4:
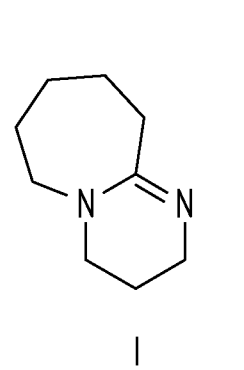
Figure 4:
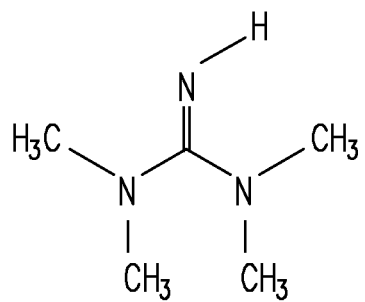
Figure 4:
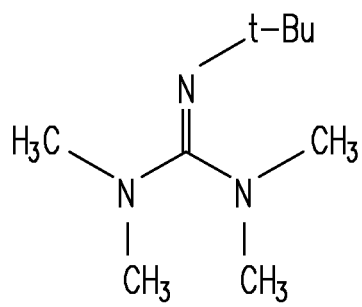
Figure 4:
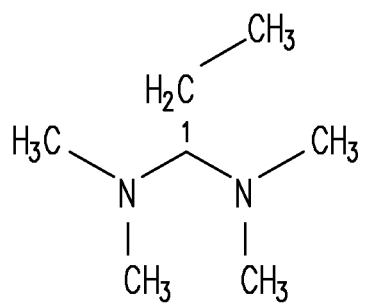

FIGS. 1, 2, and 3 show schematic drawings of various alternative embodiments that may be utilized in the present invention. FIG. 4 shows specific examples of various bases. These include amidines and guanidines such as Diazabicyclo [5.4.0]-undec-7-ene (DBU), 1,1,3,3 Tetramethylguanidine (TMG), and Barton's base. In addition in some other embodiments Hünig's base and other such simple amine bases such as triethylamine or ethyldiisopropylamine may also be utilized when stronger acid gases such as $SO_2$ are to be captured. In addition to these demonstrated forms that are shown, these bases can also be chemically modified to produce the desired physical and chemical properties for a particular system. Electron donating groups or withdrawing groups can be added to the bases to change binding energies, viscosity, etc. New bases can also be designed and synthesized to provide the desired physical and chemical properties for particular applications.

In conjunction with each of these bases is an alcohol or weak acid. In various of these preferred embodiments the alcohols that are used are generally comprised of non-sterically hindered chains that are from one to ten carbon atoms in length. The preferred chain length is from two to six carbon atoms, but higher temperature absorption processes could be envisioned based on longer carbon chain alcohols that are solids at room temperature. Branching in the alcohol chain limits the formation of the alkyl-carbonate or hetero-atom analog of alkyl-carbonate due to steric hindrance in the formation of the material. These weak acids (alcohols) may be modified by the inclusion of electron donating or electron withdrawing groups (such as, but not limited to fluorines, etc.) that changes the chemical and physical properties of the resulting weak acid (alcohol) R—XH. The choice of alcohols with the desired chemical and physical properties permits the design of acid gas capture systems that are "tuned" for a specific application or set of conditions.

These alcohol or weak acid and organic binding base combinations when reacted with a target acid gas produces a heteroatom analogue of the alkyl-carbonate with poor hydrogen bonding similar to $CO_2BOLs$. The weak coordination between the cation and anion results in lower hydrogen bonding energies compared to the high hydrogen bonding energies seen in conventional aqueous lime and caustic soda systems. The $CO_2BOLs$, $SO_2BOLs$, $CS_2BOLs$, COSBOLs, and $NO_2BOLs$ are typically liquid salts; the liquid state being attributed to the reduced hydrogen bonding and the long alcohol chains. However in some other embodiments these may be solids at standard conditions. The form of these materials is not limiting upon the scope of the invention. When in a liquid state, these materials can be used and then pumped from one location to another, whether the acid gas is bound or not, without secondary solvents to dissolve the acid gas carriers. While these embodiments are described herein as being liquids for various application advantages it is to be distinctly understood that the invention is not limited thereto but may be variously embodied.

The organic nature of $CO_2BOLs$, $SO_2BOLs$, $CS_2BOLs$, COSBOLs, and $NO_2BOLs$ result in systems that require at least 50% less energy to strip acid gases. If an organic and an aqueous system released the same acid gas at the same temperature, the organic system would require less energy as heat because the specific heat of the organic liquids are about half that of the water in aqueous systems. Each $CO_2BOLs$, $SO_2BOLs$, $CS_2BOLs$, COSBOLs, and $NO_2BOLs$ is a free-flowing liquid at standard operating temperatures. The thermal stripping of the corresponding acid gases from $CO_2BOLs$, $SO_2BOLs$, $CS_2BOLs$, and COSBOLs has been demonstrated, and the same release is expected for $NO_2BOLs$. Thermal stripping was demonstrated at temperatures well below the boiling point of the base and alcohols, preventing significant solvent loss and further reducing the energy input required to operate the acid gas capture system relative to that for an aqueous system.

$CO_2BOLs$, $SO_2BOLs$, $CS_2BOLs$, COSBOLs and $NO_2BOLs$ can be tailored to capture and release the specific type and mixture of acid gasses present in a flue gas. Each system can comprise a blend of organic liquids to capture all gases concurrently or can be used sequentially to selectively remove and purify one gas in turn from the stream. This gives the opportunity to design flue gas recovery systems that purify one acid gas from the others and delivers the acid gas for specific processing or storage. Each system can then be modified to run at temperatures from sub-ambient to higher temperatures limited only by the boiling temperatures of the chosen alcohols or bases, e.g., boiling point of the components; DBU base (259° C.), 1-hexanol alcohol (156° C.). Thermal stripping at lower temperatures reduces thermal degradation of the base and alcohols, which can increase the efficiency of the stripping process. Each system can also be modified to release acid gases at reduced pressures to high pressure systems. Varying the bases and alcohols of $CO_2BOLs$, $SO_2BOLs$, $CS_2BOLs$, COSBOLs and $NO_2BOLs$ alters the viscosity, boiling points, solvent dielectric, thermal conductivity, surface tension, heat capacity, and a host of other physical properties of these solvents, making these systems highly tunable.

In some embodiments the alcohol and amine base components in $SO_2BOL$ system can be combined on the same molecule to reversibly capture $SO_2$ as a zwitterionic liquid (zwitterionic meaning the + and − charges are on the same molecule). A tertiary alkanolamine such as N,N-dibutylundecanolamine (DBUA, shown in FIG. 5) chemically binds $SO_2$ through the alcohol moiety which is then stabilized by the base component. Pairing the base and the alcohol on one molecule provides reduced volatility of the base and alcohol components and provides unimolecular phase behavior compared to bimolecular $SO_2BOL$ systems. While various examples of zwitterionic liquids are known, none of them have been shown to be reversible (polar to non-polar) like the $SO_2BOL$ zwitterionic liquid.

Figure 5:
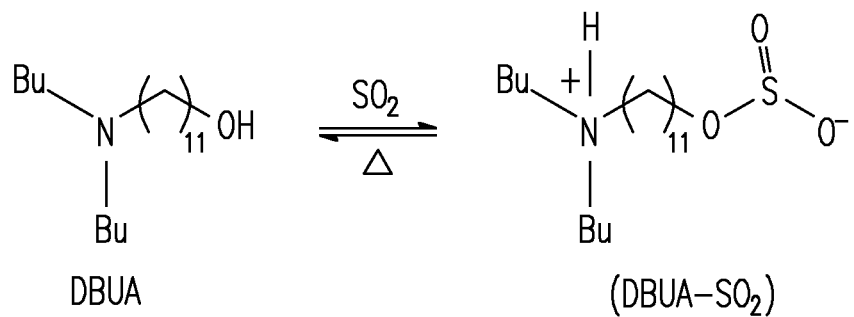
FIGS. 5 and 6 show examples of zwitterionic application of one embodiment of the present invention.
Figure 6:
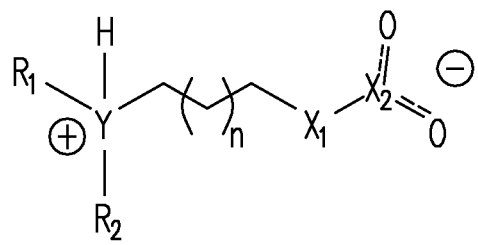

Referring now to FIGS. 5 and 6 examples of such a zwitterionic liquid are shown. The generic liquid structure that can capture $SO_2$ as a zwitterionic liquid is generally $R_1R_2X_1(CH_2)nX_2R_3$ where $X_1$=N, P and $X_2$=S, O, $R_{1,2}$=any organic fragment including but not limited to alkyl, aryl, silyl, ether, ester. The weak nucleophile can be linear or branched and n is a carbon chain having between 1 and 20 carbon atoms or is an organic linker. An organic linker is any carbon or silicon based chain that can be aliphatic, aromatic, branched or linear that links the amine and the alcohol fragments of the single component SO2BOL. In the embodiment shown in FIG. 5, DBUA chemically absorbs 1 molar equivalent of $SO_2$ as well as physically absorbs 1.5 molar equivalents of $SO_2$. In one example, one milliliter of DBUA (0.96 grams, 3.3 mmol) absorbed 0.52 grams (8.1 mmol) of $SO_2$, 35% $SO_2$ by weight. The zwitterionic liquid can be stripped of $SO_2$ by heating to 70° C. The polarity switching of DBUA between its nonionic and zwitterionic forms was demonstrated by placing 0.35 mL of DBUA and 0.35 mL of hexanes (FIG. 4) in a glass vial. DBUA was miscible with hexanes until $SO_2$ was sparged through the solution for 10 minutes at 0° C. The hexanes partitioned out into a separate phase when DBUA was converted into its more polar zwitterionic form. In these embodiments, the $SO_2BOL$ zwitterionic liquids react just like the dual component $SO_2BOL$ liquid systems. While the first example of a reversible zwitterionic liquid is comprised of a combination of an alcohol and tertiary amine, it is understood that this composition is demonstrative and in no way limiting. Any weak nucleophile (ROH, RSH, $R_2NH$) can be substituted for the alcohol component, and any base ($R_3N$, $R_3P$) can substitute for the amine. The $SO_2BOL$ zwitterionic liquids can be chemically modified to alter any physical or chemical property.

These systems could be used on industrial and laboratory scales for any application wherein an acid gas is used as a chemical trigger for to switch solvent polarity, miscibility, or chemical binding with weak acid (alcohol) and base blends. Such examples are flue gas scrubbing, post-combustion absorption of acid gases in numerous fossil fuel combustion processes, and in pre-combustion acid gas absorption in coal gasification and other similar processes. These acid gas binding organic liquids can be direct replacements for lime and caustic soda, being more energy efficient, less corrosive and recyclable. If used on an industrial scale, $SO_2BOLs$, $CS_2BOLs$, COSBOLs, and $NO_2BOLs$ could reduce the energy requirements and reduce the energy costs for capture of each acid gas for flue gas scrubbing. Each system can be designed to deliver clean $SO_2$, $CS_2$, COS, $NO_2$ for post combustion processing, generating products that have economic value.

In addition to these aforementioned applications, the reaction of these acid gas binding organic materials creates materials having different colors. As a result these systems can also be potential acid gas sensors due to their specific color associated with chemical binding of each acid gas. These systems can also be fabricated on solid supports such as silica or alumina to make gas scrubbing respirators or other potential dosed system gas scrubbers. In addition, these new ionic liquids can be employed as reversible solvents and reagents in chemical reactions, as reactants in separations chemistry, ligands for phase-transfer catalysis, potentially reversible surfactants, reversible metal complexing, metal capture or chelation; phase catalysis or scrubbing systems; as temperature controlled acid reagents, and in other applications.

The $SO_2BOL$ zwitterionic liquid can be used at the laboratory and industrial scale for any applications where $SO_2$ is the chemical trigger to switch polarity, miscibility, or conductivity. Examples of applications of the $SO_2BOL$ zwitterionic liquid for chemical separations include but are not limited to flue gas scrubbing, post-combustion acid gas absorption, and desulfurization of gas streams, The $SO_2BOL$ zwitterionic liquid can be used as a $SO_2$ sensor either by color change or electrical. Examples of the $SO_2BOL$ zwitterionic liquid in miscibility applications include but are not limited to reversible surfactants, solvent separations and coatings for chromatography columns for separations chemistry. The $SO_2BOL$ zwitterionic liquid can also be used in applications where a conductivity switch would be required, examples include but are not limited to use as media for electrochemical reactions, electrical sensors or battery electrolytes. The $SO_2BOL$ zwitterionic liquid can also be used as a chemical coating or functionalized on a support. The zwitterionic liquids can also be used as reversible ligands for phase-transfer catalysis, metal complexing or capture, or as temperature controlled acid reagents.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A reversible zwitterionic liquid having the structure

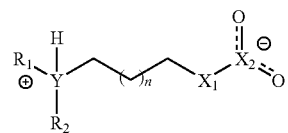

wherein R1 is selected from the group consisting of alkyl, aryl, silyl, ether, and ester, R2 is selected from the group consisting of alkyl, aryl, silyl, ether, and ester, X1 is selected from the group S, and O; X2 is S; n is between 1 and 20 carbon links or an organic linker, and Y is any structure that can connect with R1, R2 and H as shown.

* * * * *